June 24, 1930.   J. WEBER ET AL   1,767,633
PEEL DUSTING MACHINE FOR BAKERY PURPOSES
Filed Feb. 11, 1929   2 Sheets-Sheet 1
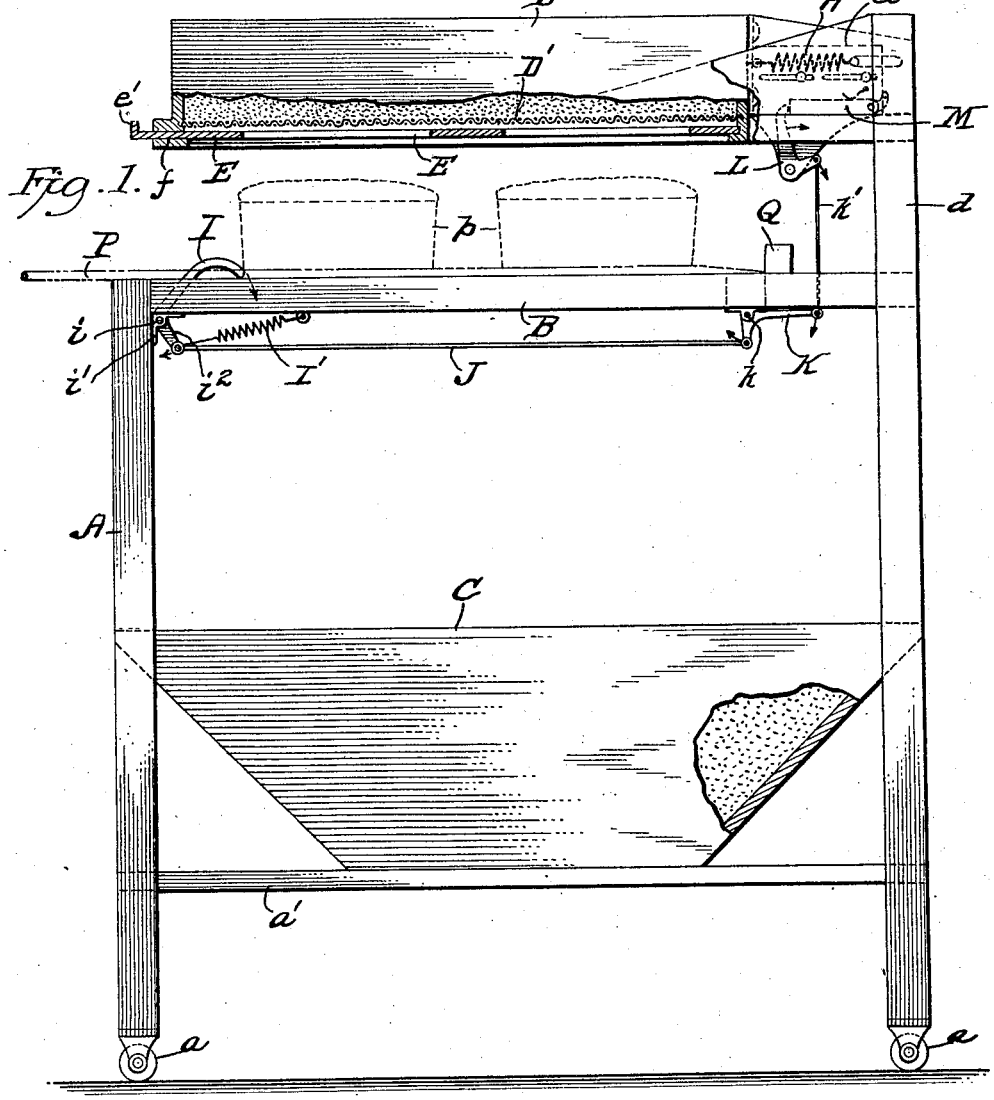
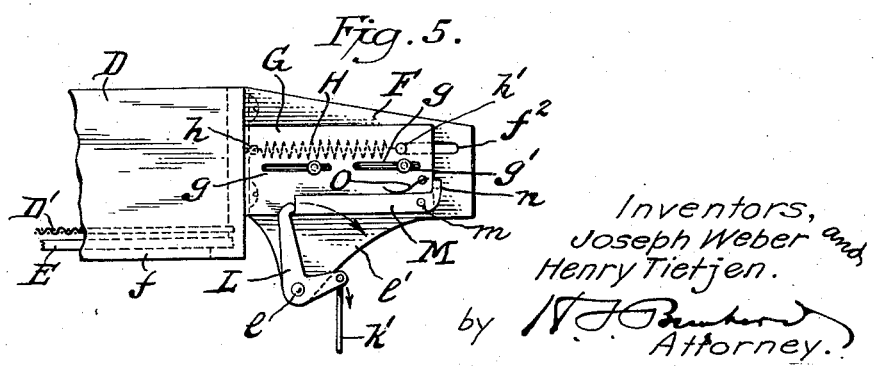
Inventors,
Joseph Weber and
Henry Tietjen.
by
Attorney.

June 24, 1930.   J. WEBER ET AL   1,767,633
PEEL DUSTING MACHINE FOR BAKERY PURPOSES
Filed Feb. 11, 1929   2 Sheets-Sheet 2
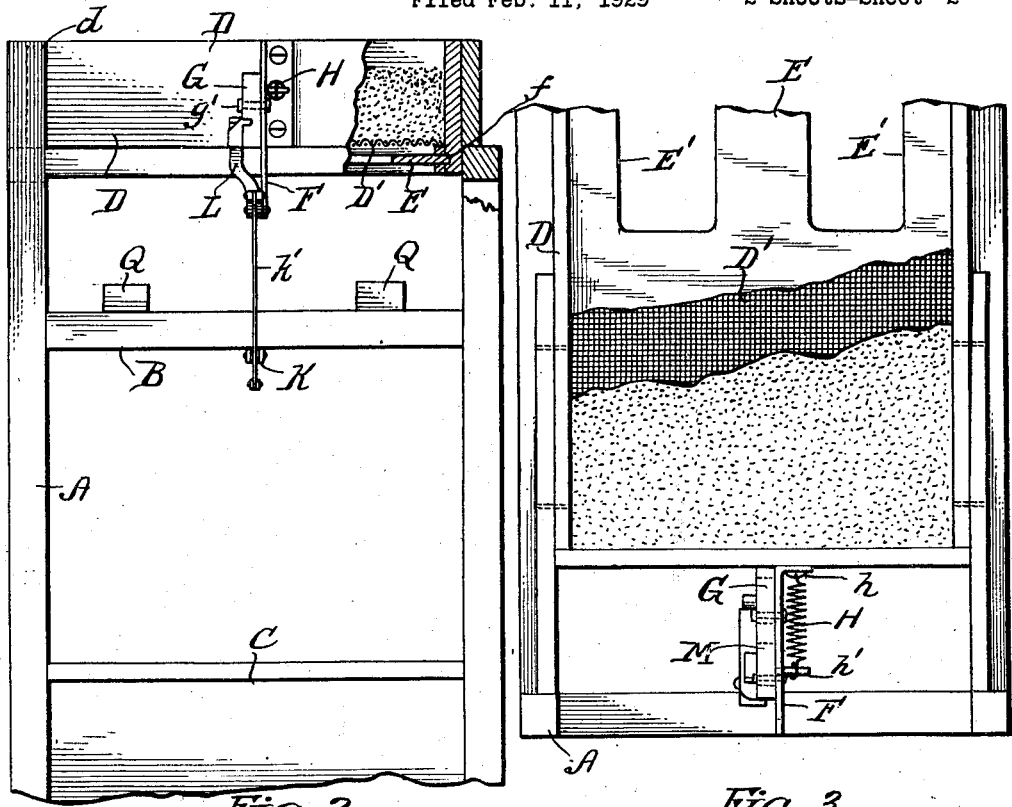
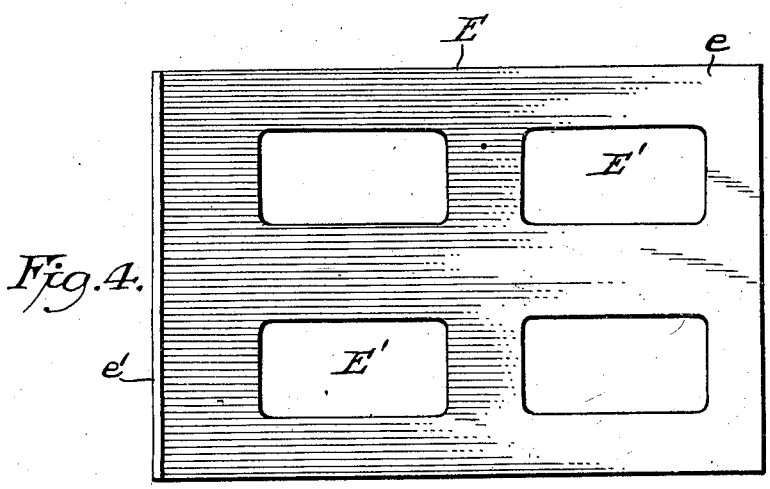
Inventors.
Joseph Weber and
Henry Tietjen.
By
Attorney.

Patented June 24, 1930

1,767,633

UNITED STATES PATENT OFFICE

JOSEPH WEBER, OF JERSEY CITY, AND HENRY TIETJEN, OF HOBOKEN, NEW JERSEY

PEEL-DUSTING MACHINE FOR BAKERY PURPOSES

Application filed February 11, 1929. Serial No. 339,057.

Our invention pertains to bakery machinery, and more particularly to a machine whereby unbaked dough in the form of bread loaves may be dusted on the under side with a powdery material, such as corn meal, as a preliminary step to the introduction of the loaves into an oven.

The machine takes up a small floor space, is movable at will to a desirable location with reference to the ovens, is simple and operates without power so that there is a minimum tendency to get out of order, provides storage space for a relatively large quantity of the powdery material, and distributes such material over the peel to be occupied by the dough loaves only, so that the material will not fall into the ovens, reducing to a minimum the possibility of combustion in the ovens, and thus attains economy by eliminating fires and secures, also, economy in the distribution of the powdery material.

Our invention is a machine comprising a suitable frame with a table for the peels and with a storage space or bin for the powdery material. Above the table is a sifting box having a perforated bottom, and with this box is associated means for giving a jarring or vibratory motion to said box, whereby the box is shaken to sift the powdery material through the perforated bottom and upon the peel on the spaces to be occupied by the loaves of dough to be placed on the peel resting upon the table. The jarring motion is given to the sifting box by the action of a hammer bolt with which is associated a latch co-operable with a trigger under the control of a lever in the path of the peel, whereby the deposit of the peel on the lever actuates the trigger to release the hammer bolt.

Other functions and advantages of the invention will appear from the following description taken in connection with the drawings, wherein—

Figure 1 is a side elevation of a peel dusting machine embodying our invention, a part of the storage bin, and a part of the sifting box, being broken away and in section.

Figure 2 is an elevation looking toward the right hand side of the machine illustrating the sifting box and the hammer mechanism with a part of the sifting box broken away and in section.

Figure 3 is a plan view of a part of the machine with the sifting box broken away to illustrate the perforated bottom and the template.

Figure 4 is a detailed plan view of the template.

Figure 5 is an elevation on an enlarged scale of the hammer mechanism associated with the sifting box.

The apparatus of our invention is portable for the purpose of moving the machine from one place to another within the bakery so as to be adjacent to the ovens. The portable machine embodies a frame A, provided with castors $a$, said frame being of any suitable construction. The upper part of the frame is provided with a table B, and below this table is a storage bin C supported on suitable rails $a'$ attached to the frame, said bin providing for the storage of a substantial quantity of the powdered material which is to be sifted on the peel over the spaces to be occupied by the loaves of unbaked dough. The material ordinarily employed by bakers for this purpose is corn meal, but, obviously, any material appropriate for the purpose may be employed.

Extending upwardly from the frame, at one side thereof, are posts $d$ for supporting the sifting box D, the same extending horizontally over the table and spaced relatively thereto.

The sifting box is provided with a perforated bottom D', shown in Figures 1, 2 and 3, is composed of screen material, and below the perforated bottom the sifting bottom is open throughout its length and width, thus affording means whereby the powdered material may be distributed freely by a jarring or vibratory motion imparted to the sifting box structure.

With the sifting box is associated a template E, shown in detail in Figure 4, and in an operative position in Figures 1, 2 and 3. This template consists of a single piece of wood $e$, provided at one edge with an upstanding flange $e'$, and in the body of the template are openings E', the size and form of which correspond to the dimensions and form of the spaces to be occupied by dough loaves, upon which the powdered material is to be sifted. For supporting the template in operative relation to the sifting box, we have provided suitable guideways $f$ in the walls of the sifting box below the perforated bottom D'. The template is fitted in the guideways $f$, and is moved with a sliding motion to an operative position below the perforated bottom D'; see Figures 1 and 2. The template is thus detachably connected with the sifting box, and it can be dismounted by sliding it out of place so that templates with other openings E' may be used interchangeably in connection with the sifting box.

The hammer mechanism for jarring the sifting box is shown in operative positions in Figures 1, 2 and 3, and in detail in Figure 5. Said hammer mechanism includes a supporting plate F attached fixedly to an end wall of the sifting box, substantially centrally thereof. This plate is provided with a longitudinal slot $f^2$, and on the supporting plate is mounted a slidable hammer bolt G. The hammer bolt, as shown in Figure 5, is provided with longitudinal slots $g$ to receive the guide pins $g'$ fixed to the supporting plate, so that the hammer bolt is slidable on the supporting plate. The hammer bolt is under the control of the spring H, one end of which is attached to an anchoring bolt $h$ attached fixedly to the sifting box, whereas the other end of the spring is connected to pin $h'$, shown in Figure 5 as slidably fitting in the slot $f^2$. The hammer bolt is arranged to have contact with the end wall of sifting box D, and when the spring is placed under tension and the hammer bolt is released, said hammer bolt is impelled forcibly against the sifting box for imparting thereto the required jarring or vibratory movement.

The hammer bolt is controlled by a peel adapted to be deposited upon the table B. The means for actuating the hammer bolt by the weight of the peel is as follows: I is a lever, preferably curved, as shown in Figure 1, and extending through the table B. The lever is fulcrumed by a pin $i$ to a bracket $i'$ fast to the frame. Said lever is provided with an arm $i^2$ to which is connected a spring I' and an operating rod J, said spring acting to move the curved end of the lever into a position raised above the top of the table B. The rod J extends to a bell crank lever K pivoted at $k$ to the under side of the table, and to the other end of this lever K is connected a vertical rod $k'$. The upper end of this vertical rod is pivoted to a trigger L fulcrumed by a pin $e$ to a depending lub $e'$ of the supporting plate F, see Figure 5. The free end of the trigger L is normally in engagement with latch M which is pivoted by a pin $m$ to the hammer G, and this latch is provided with a lug $n$ acting as a stop to limit the swinging movement of the latch M on its pivot $m$. The latch is under the influence of spring O attached to the hammer bolt.

In the service of our machine, the bin C is loaded with a desirable quantity of the powdered material, and some of this material is transferred from the bin into the sifting box D in any suitable way. It is common practice for bakers to mold dough in the form of loaves, and to place such molded dough on flat pans, which are known in the trade as "peels". In Figure 1 there is shown in dotted lines a "peel" P having imposed thereon loaves of molded dough $p$, which loaves rest on the powdered material sifted on said peel in the spaces thus occupied. The operator moves the peel from the table B, and below the sifting box, the position of the peel being determined by backstop Q fixedly attached to the table and extending upwardly therefrom, whereby the peel may be placed upon the table for the molded dough loaves $p$ to be in register with the openings E' of the template E.

In the operation of introducing the peel upon the table, the operator moves the peel into contact with the backstop Q, and lowers the peel upon the lever I, the weight of the peel acting to depress said lever against the tension of spring I'. The depression of the lever pulls on the rod J, moves the bell crank lever K, and throws the trigger L in a direction to move the hammer bolt G away from contact with the sifting box D. This movement of the hammer bolt increases the tension of the spring H, and the arcuate movement of the trigger moves its free end away from contact with the latch M, whereupon the trigger is made free from the hammer bolt. At this stage spring H impells the hammer bolt into contact forcibly with the shifting box for imparting the required jarring or vibratory motion to the sifting box necessary to agitate the powdered material, and cause the same to be sifted upon the spaces to be occupied by the molded dough carried by the peel P, the powdered material passing through the screen D' and through the openings E' of the template. The peel containing the powdered material is removed from the machine and introduced into the oven, but it is to be noted that the template restricts the area from which the powdered material is distributed, so that there is a minimum amount of powdered material deposited upon the peel, and the powdered material is sifted only upon the spaces to be occupied by the molded dough.

With the removal of the peel from the table, the lever I is returned by the spring I' to a raised position, and this return to normal of the lever I acts on the bell crank lever K to return the trigger L to normal, the latch M being free to move on its pivot so that the free end of the trigger, will again engage with the latch so as to place the parts in condition for operation when the peel is placed upon the table.

The powdered material is shifted on the peel to cover the spaces to be occupied by the loaves. Figure 1 of the drawings shows the dough loaves in position on the peel, but before the loaves are deposited on the peel, it is to be understood that the peel is placed in position, and the machine operated to drop the powdered material from the feed box and through the openings over the template, so that the powdered material will then be dropped upon the peel to cover the spaces which are occupied subsequently when the dough loaves are placed on the peel before introducing the loaded peel into the oven.

Having thus fully described the invention, what we claim as new and desire to secure by Letters Patent is:

1. In a peel dusting machine, a sifting box provided with a perforated bottom, a spring-actuated hammer carried by the sifting box, and a peel-actuated trigger for locking and releasing said hammer.

2. In a peel dusting machine, a sifting box, hammer mechanism for jarring said box, a peel-actuated lever below the box, a trigger for said hammer mechanism, and means connecting said lever with said trigger.

3. In a peel dusting machine, a sifting box, a spring-actuated hammer, a latch for said hammer, a trigger co-operable with said latch, and a peel actuated member connected with said trigger.

4. In a peel dusting machine, a frame, a sifting box on the frame, spring actuated hammer means mounted on said box, a trigger for said hammer means, and means carried by said frame for operating said trigger whenever a peel is placed on said frame.

In testimony whereof we have hereto signed our names this 2nd day of February, 1929.

JOSEPH WEBER.
HENRY TIETJEN.